Oct. 1, 1968  C. C. WILLIAMS  3,403,730
FAIL-SAFE PIPE SADDLE FOR ADAPTERS FOR JET PUMPS
Filed May 8, 1967  2 Sheets-Sheet 1
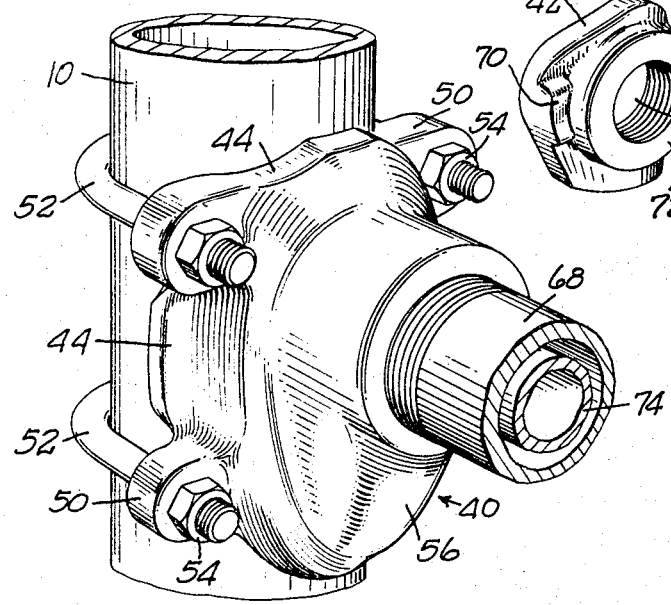
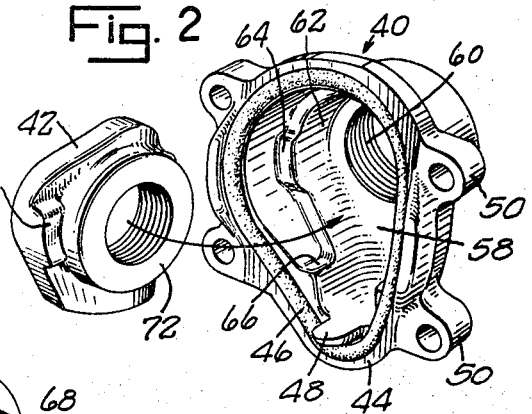
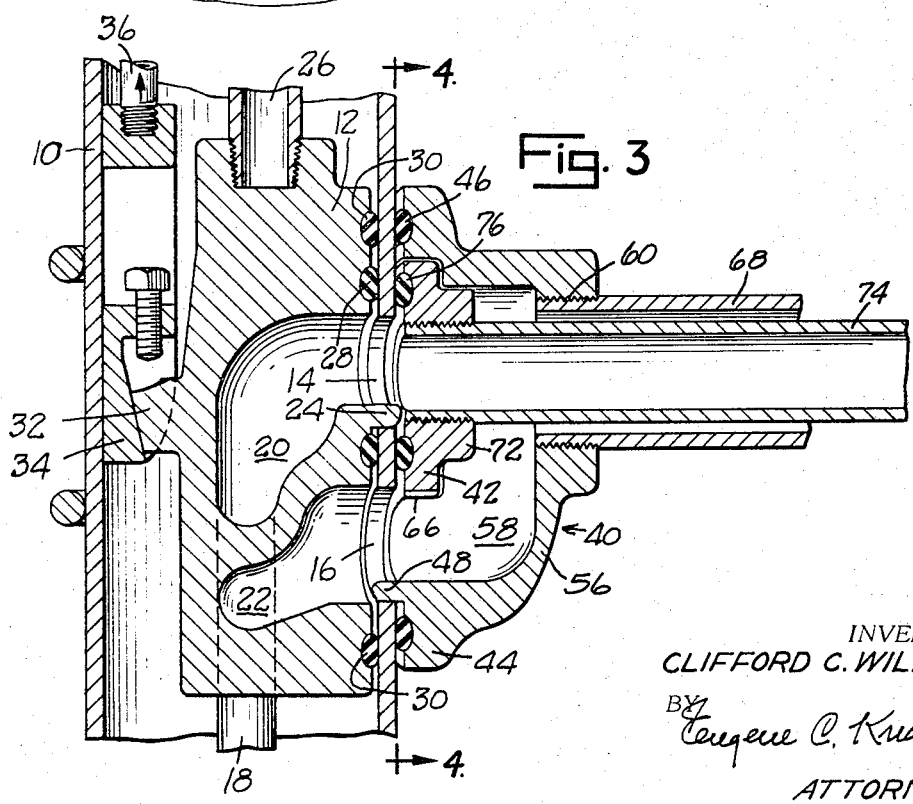
INVENTOR.
CLIFFORD C. WILLIAMS
BY Eugene C. Knoblock
ATTORNEY

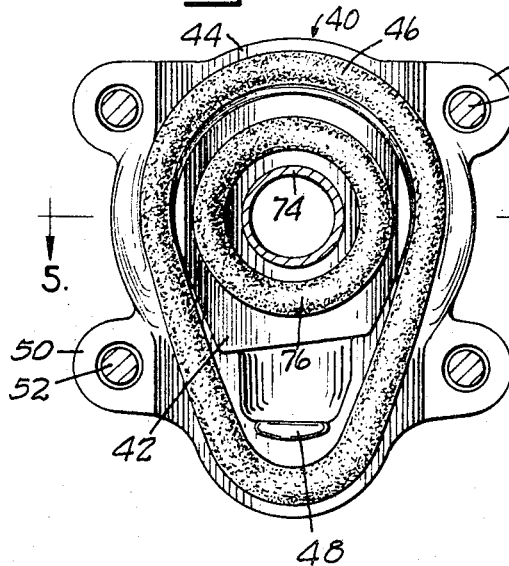
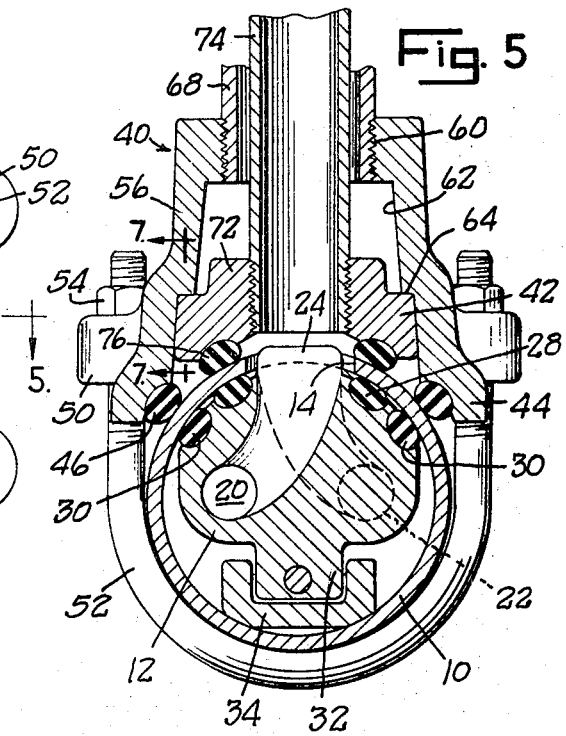
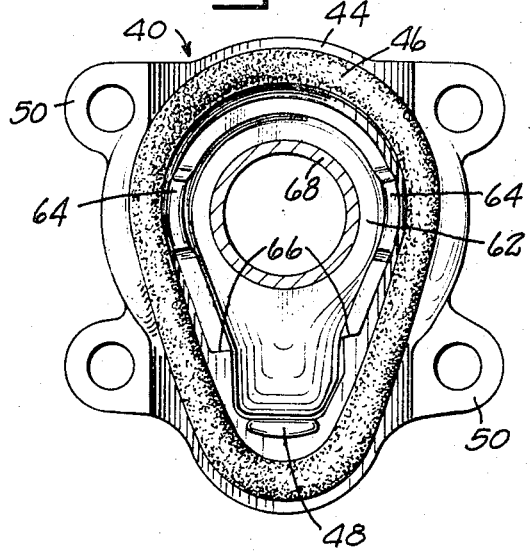
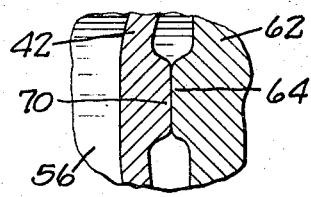

United States Patent Office 3,403,730
Patented Oct. 1, 1968

3,403,730
FAIL-SAFE PIPE SADDLE FOR ADAPTERS FOR JET PUMPS
Clifford C. Williams, Box 681, Joliet, Ill. 60434
Filed May 5, 1967, Ser. No. 636,456
5 Claims. (Cl. 166—88)

ABSTRACT OF THE DISCLOSURE

A fail-safe pipe saddle for adapters for jet pumps, having an outer saddle with an interior chamber and a marginal seal surrounding two well casing apertures and compressed by drawing the outer saddle toward the pipe. An inner saddle having a marginal seal surrounding only one of said well casing openings is pressed toward the well casing by limited area abutment means of the outer saddle in whose chamber it fits with clearance. An outlet pipe from the inner saddle is positioned with clearance in an outlet pipe from the outer saddle.

---

This invention relates to a fail-safe pipe saddle for adapters for jet pumps.

Jet pumps are commonly used for water wells and require two water flow paths between the pump outside of the well casing and an ejector within the well casing. When used with pitless adapters two lines connect the ejector and the adapter, which adapter has separate passages therethrough, and two lines connect the adapter outlets with the pump, as by means of a saddle anchored upon the well casing and providing connection with the water lines or conduits.

One of the important requirements of a pitless adapter to meet minimum standards of sanitation is that the same shall be fail-safe. That is, if any failure is to occur it must cause leakage under the pressure of the system in an outward direction from the adapter to the surrounding earth, rather than to permit leakage of ground water into the well system, as into the well casing or into the pipes connecting the adapter and the pump. This is difficult to accomplish in the saddle part of an adapter for a jet pump because of the fact that water flows inwardly in one of the lines while water flows outwardly in the other line.

The fail-safe construction can be accomplished by welding a saddle or fitting to the well casing if the welder is able to produce leak-proof welds. Since welding must be accomplished below ground level, i.e. at a level below the frost line, it is performed under difficult conditions. In usual practice, few welders are able to accomplish completely leak-proof welds under these conditions.

It is the primary object of this invention to provide a pipe saddle for an adapter for jet pumps which utilizes separate casings which fit one within another and each of which is provided with a seal engageable with the well casing, which parts are so arranged that if any leakage in the unit occurs at the outer seal, it will produce flow in an outward direction under system pressure, while if leakage occurs at an inner seal there is no health hazard, but only reduced pump efficiency.

A further object is to provide an adapter of this character having two parts using seals under compression, which parts fit one within another and so engage each other and cooperate with the well casing that sealing pressure exerted against the outer part is transmitted to the inner part and the seals of both the outer and inner parts engage the well casing simultaneously and effectively.

A further object is to provide a device of this character having inner and outer parts which are so correlated as to be positioned in proper relation when they interfit, and in which proper correlation of the passage of each part with one of two separate openings in the well casing is effected by positioning means carried by the outer part and engaging the well casing at one of said casing openings.

Other objects will be apparent from the following specification.

In the drawings:

FIG. 1 is a perspective assembled view of my new pipe saddle mounted upon a well casing and having lines external of the well casing connected thereto.

FIG. 2 is a perspective view illustrating the two parts of the pipe saddle separated, with the outer part being viewed at its inner face and the inner part being viewed at its outer face.

FIG. 3 is an axial sectional view illustrating the cooperative relation of my new pipe saddle and an adapter body with a well casing and the conduits connecting the pipe saddle with a water storage tank.

FIG. 4 is an inner view of the assembled pipe saddle taken in the direction of the arrows 4—4 of FIG. 3.

FIG. 5 is a horizontal sectional view of the pipe saddle mounted upon a well casing and correlated with a pipe adapter, as viewed on line 5—5 of FIG. 4.

FIG. 6 is an inner face view of the outer part only of the pipe saddle.

FIG. 7 is an enlarged detail sectional view taken on line 7—7 of FIG. 5 and illustrating the abutting portions of the inner and outer saddle parts, and the clearance space between said inner and outer parts.

Referring to the drawings which illustrate the preferred embodiment of the invention, the numeral 10 designates a well casing within which an adapter body 12 is mounted at a suitable level below the top of the well casing and below the frost line for communication with a pair of spaced openings 14 and 16 in the well casing. Drop pipes 18 are connected to passages 20 and 22 in the adapter and serve to provide connection with and support for an ejector (not shown) which is located in the well casing at a level to effect pumping of water from the lower part of the casing. The upper part of the casing (not shown) extends above ground level and is provided with a cap (not shown) serving to seal the same.

For purposes of illustration, the adapter shown herein at FIGS. 3 and 5 is of the type shown in my U.S. Patent No. 2,968,256, dated Jan. 17, 1961, but other adapters may be used. This adapter is characterized by a body 12 having a lip 24 adapted to enter one casing opening, such as uppermost well casing openings 14 when the adapter, the drop pipes, and the ejector are lowered in the well casing to proper elevation, as by means of a lift member 26. The adapter body 12, at the face adjacent to the outlet openings 14 and 16, is provided with grooves receiving gasket rings 28 and 30 engageable with the inner face of the well casing 10 around the openings 14 and 16.

The adapter body 12 is provided with one or more cam members 32 remote from the gasketed portion thereof with which engage one or more adjustable wedge members 34 having vertically inclined surfaces so oriented relative to the cam 32 as to press the adapter body 12 in the direction of the openings 14 and 16 to effect sealing engagement of the gaskets 28 and 30 with the well casing around said openings when the wedge means 34 is moved longitudinally along and contacting the well casing and relative to cam means 32, as by a draw member 36. In the construction shown, the cam 32 and wedge 34 have contacting vertically inclined surfaces so oriented that an upward pull on the draw member 36 causes the adapter 12 to be anchored in the casing and a seal to be effected at gaskets 28 and 30, while downward movement of the wedge 34 relative to the adapter 12 will release the sealing pressure on the gaskets, as for the purpose of freeing the parts from the well casing and permitting withdrawal of the adapter from the well casing. It will be understood, however, that the parts may be reversed to seal upon downward wedge movement and release upon upward movement of the wedge.

My new saddle comprises an outer saddle part 40 and an inner saddle part 42. The outer saddle part 40 has a marginal or rim portion 44 having a concave face which is interrupted by an endless groove to receive an outer sealing gasket 46 engageable with the outer surface of the well casing 10 and of a size and shape to encircle both of the well casing openings 14 and 16 with clearance. A lip 48 projects from the rim 44 and seats in one of the well casing openings, here shown as the opening 16. Ears 50 project from the marginal or rim portion 44 of the outer saddle and each is apertured to receive an end portion of a U-bolt 52. The ends of the U-bolts are screw threaded to receive nuts 54 by means of which the outer saddle may be urged toward the well casing to effect a continuous seal therewith at the gasket 46.

The outer saddle has a dome-shaped central portion 56 which defines the chamber 58 therein. A threaded opening 60 is formed in the central part 56 of the outer saddle 40. The inner face of the dome-shaped central portion 56 is characterized by a chamber part 62 adjacent to and communicating with the threaded opening 60 and spaced from the well casing, and is also characterized by one or more abutment shoulders 64 projecting inwardly from the general contour of the chamber. The chamber parts 56, 62 are also characterized by an irregular or non-circular configuration and by one or more abutment shoulders at 66, as seen in FIGS. 2 and 6, for purposes to be described. A water discharge conduit 68 is threaded in opening 60.

Inner saddle part 42 fits within the dome-shaped part 56 with clearance and includes a part of a size and shape to be received in the irregular chamber of the dome. Inner saddle part 42 is positioned by engagement with the shoulders 66, preferably spaced above the bottom part of the dome 56, and by abutment of projections 70 thereof with shoulders 64 of the outer saddle part. The inner saddle part has an internally threaded hub portion 72 whose bore communicates with the well casing opening 14 in the operative position of the parts as illustrated in FIG. 3, and a conduit 74 is screw threaded in said bore and is of a size to fit with clearance within the conduit 68. The inner saddle part 42 has a concave face confronting the well casing and provided with an endless groove therein surrounding the threaded bore thereof and receiving a gasket ring 76 spaced inwardly from the gasket ring 46 and engageable with the outer face of the well casing immediately surrounding the casing opening 14.

In use or installation, complementary inner and outer saddle parts 40, 42 are selected according to the size of the well casing 10 to which they are to be applied. In this connection, the interior configuration of each outer saddle part 40 for a given size will be different from the configuration of all other sizes, as by variation in the location of the shoulders 66 or in the shape or size thereof. Consequently, by selecting a type of inner saddle 42 correlated to the pecularities of the interior configuration of the outer saddle with which it is intended to be used, a user is assured, when any given inner saddle 42 fits within an outer saddle 40, that the two parts are mates. The saddle parts, so assembled, are then applied to the well casing 10, being positioned with the lip 48 entering the proper well casing aperture 14, 16 and thereby assuring register and alignment of conduits 68 and 74 with the upper opening 14 as shown and also assuring communication of the saddle chamber 58 and of the passage between the conduits 68, 74 with the well casing opening 16. The saddles are then anchored in place by means of the U-bolts 52 and the nuts 54. The tightening of the nuts 54 serves to compress the outer gasket 46 to effect a continuous seal with the well casing. The same tightening action is transmitted through the contacting abutments or shoulders 64, 70, as seen in FIGS. 5 and 7, from the outer saddle 40 to the inner saddle 42 for the purpose of compressing the gasket 76. The saddle is then in operative condition.

It will be observed that there is a clearance space within the chamber 58 of the outer saddle part 40 and around the inner saddle part 42 at all parts of the latter except at the abutments or shoulders 64, 70. Consequently, assuming that conduit 74 and passage 20 are parts of a suction line, and that chamber 58 and passage 22 are under the pressure of the well system, if any failure or leakage occurs at the gasket 76, or at the threaded connection of the conduit 74 with the inner saddle 42, such leakage will open the aperture 14 and the conduit 74 into communication with the chamber 58. The chamber 58 is under the pressure of the system which is retained against leakage by the gasket 46 and the threaded connection 60. If any leakage occurs at gasket 46 or threaded connection 60, the leak is subject to the pressure in the system and hence will occur in an outward direction.

These results are accomplished by the minimum number of parts which are readily handled and assembled and applied. At no time is there any possibility of any leakage at either the outer saddle 40 or the inner saddle 42 causing an inwardly directed flow of ground or surface water into the well system.

While the preferred embodiment of the invention has been illustrated and described, it will be understood that changes in the construction may be made within the scope of the appended claims without departing from the spirit of the invention.

I claim:

1. A fail-safe pipe saddle for adapters for jet pumps in which water flows in separate paths in opposite directions, comprising an outer saddle engageable with a well casing having two spaced openings,
a seal carried by the inner face of the marginal portion of said outer saddle and engaging said well casing around said openings,
said outer saddle defining a chamber communicating with one of said well casing openings,
an inner saddle having an outlet communicating with the other well casing opening,
a seal carried by the inner face of the marginal portion of said inner saddle and engaging said well casing around said other well casing opening and clear of said first named well casing opening,
said inner saddle fitting in said outer saddle chamber with clearance and having at least one limited area of abutment with said outer saddle,
means for anchoring said outer saddle on the well casing and urging said saddle toward said well casing and against said inner saddle at said abutment area to simultaneously compress both of said gaskets against said well casing,
a large diameter outlet conduit connected to said outer saddle outlet, and
a small diameter outlet conduit connected to said inner saddle outlet and extending through said large outlet conduit with clearance.

2. A fail-safe pipe saddle as defined in claim 1, wherein said outer saddle chamber has a non-circular chamber portion complementary to the shape of and receiving and positioning said inner saddle.

3. A fail-safe pipe saddle as defined in claim 1, wherein said outer saddle has a projection at its margin inwardly of its gasket and seating in said outer well casing opening to position said saddle in proper relation to said well casing openings.

4. A fail-safe pipe saddle as defined in claim 1, wherein said seals engage said well casing with substantially uniform pressure throughout their full extent and are spaced apart for communication with said outer saddle chamber.

5. In combination, a well casing having two spaced openings intermediate its length, an adapter in said casing having two passages for water flow in opposite directions and each registering with a casing opening, seal means carried by said adapter and engageable with the inner face of said casing around the respective casing openings, means anchoring said adapter in said casing and pressing said seal means against said casing, an outer saddle unit encircling said casing and having a chambered part carrying a marginal seal engaging said casing and surrounding both casing openings, an inner saddle fitting with clearance in said outer chambered saddle part and carrying a marginal seal engaging said casing and surrounding only one casing opening, said outer and inner saddle parts having limited area abutment means for transmitting gasket sealing pressure from said outer to said inner part so as to simultaneously compress the seals of both saddles, an outlet conduit connected to said inner saddle, and an outlet conduit connected to said outer saddle in substantially axial alignment with and receiving with clearance said first outlet conduit.

References Cited
UNITED STATES PATENTS

| | | | |
|---|---|---|---|
| 2,851,106 | 9/1958 | Dicken | 166—88 |
| 2,960,166 | 11/1960 | Haydin et al. | 166—88 |
| 3,183,973 | 4/1965 | Eging | 166—89 |
| 3,306,358 | 2/1967 | Williams | 166—89 |

JAMES A. LEPPINK, *Primary Examiner.*